(No Model.)  2 Sheets—Sheet 1.

D. C. MARKHAM.
CULTIVATOR.

No. 430,965. Patented June 24, 1890.

WITNESSES
Jos. H. Blackwood

INVENTOR
Dewitt C. Markham
by Wm. H. Doolittle
Attorney

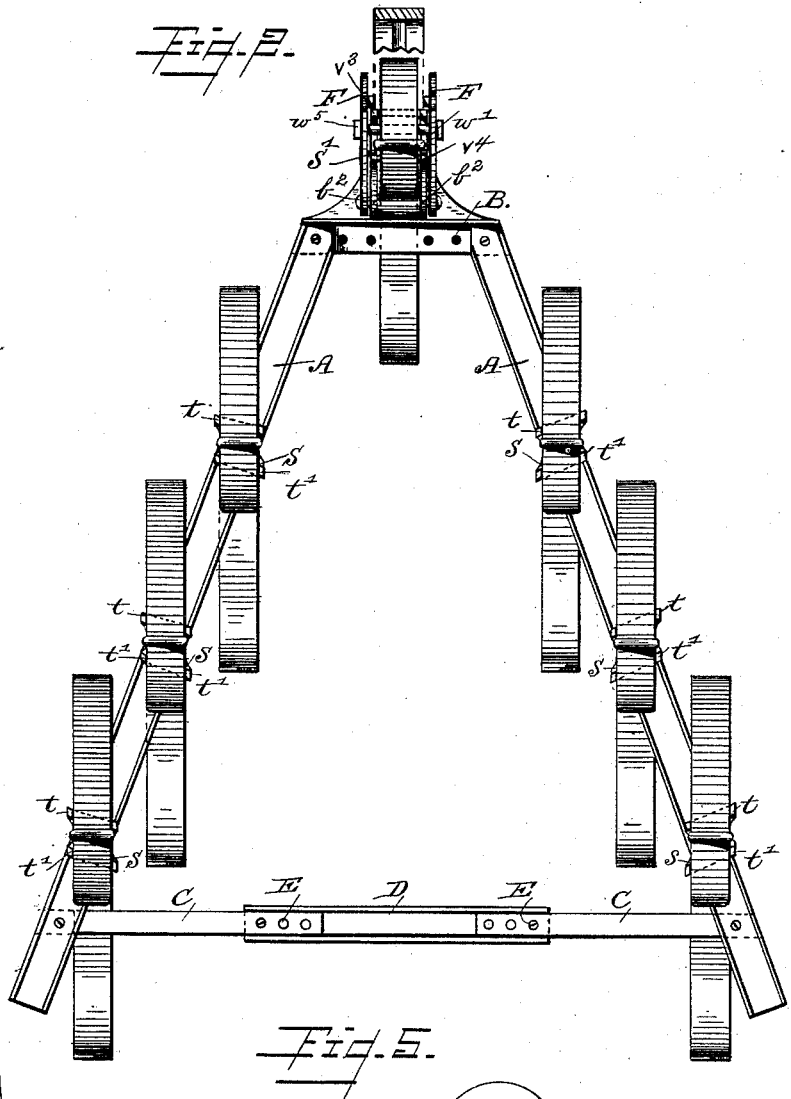

UNITED STATES PATENT OFFICE.

DEWITT C. MARKHAM, OF COLLINSVILLE, NEW YORK.

CULTIVATOR.

SPECIFICATION forming part of Letters Patent No. 430,965, dated June 24, 1890.

Application filed December 13, 1888. Serial No. 293,945. (No model.)

*To all whom it may concern:*

Be it known that I, DEWITT C. MARKHAM, a citizen of the United States, residing at Collinsville, in the county of Lewis and State of New York, have invented certain new and useful Improvements in Cultivators; and I do hereby declare the following to be a full, clear, and exact description of the invention, such as will enable others skilled in the art to which it appertains to make and use the same.

My invention relates to cultivators; and it consists of improvements in an A-shaped spring-toothed cultivator, which have for their objects to improve the manner of holding the teeth and the means of adjusting the length and width of the cultivator. They are illustrated in the accompanying drawings, in which—

Figure 1:
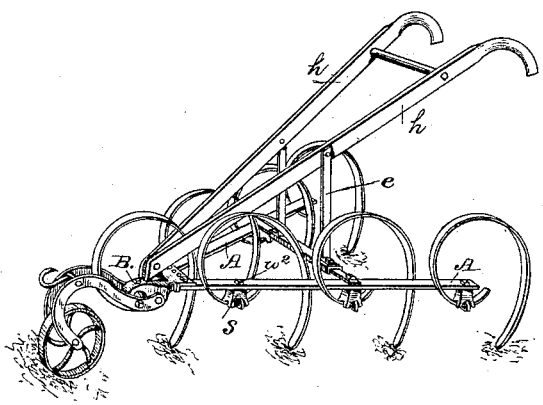
Figure 3:
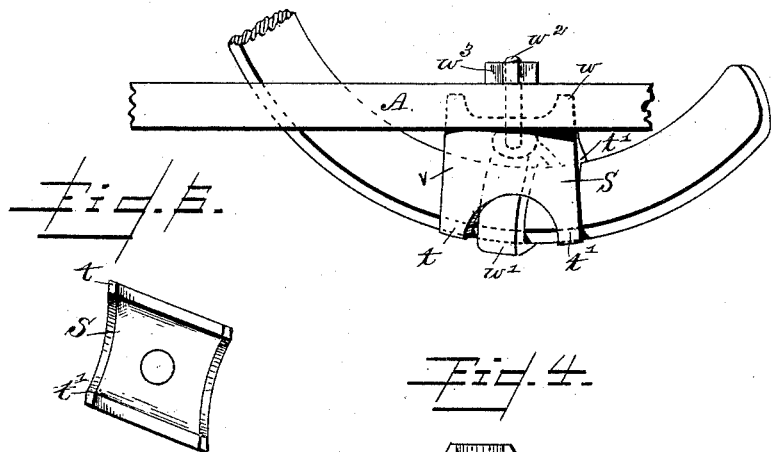
Figure 4:
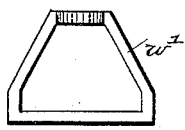

Figure 1 is a perspective view in elevation; Fig. 2, a bottom plan; and Figs. 3, 4, 5, and 6, details.

Referring to the drawings, the frame of the cultivator is shown composed of two arms A A, preferably of channel-iron, (or they may be of H or other form of angle-iron or of wood,) united by a front cross-plate B and rear cross-plate C C and D. Cast in one piece with the front cross-plate B is a saddle or seat B′, on the upper side of which is lug $b$, to which are bolted the handles $h$. The rear plates C C are straps, each provided with a series of holes, and are adapted to enter and slide in the channel of the plate D, and held at the position desired by means of bolts and nuts E. The handles are secured to the plate D by means of braces $e$, which are turned at right angles at the bottom to form lugs, through which the bolts E′ are passed, and thus the same bolts unite the braces, the central strap, and the side straps. The arms of the cultivator are thus adjusted to and from each other to make it wider or narrower, as desired. The front cross-plate B being provided with a series of holes the side arms are adjustable at that end by means of bolts and nuts connecting that plate with the arms. The curved forked arms F, between which the wheel is carried, are pivoted at their rear ends to ears $b^2$ on the under side of the plate B.

S is a saddle, to which each of the side spring-teeth are secured. Its form is shown more fully in Figs. 2, 3, and 6. It has end walls $v$, having upwardly-projecting lugs $t\ t'$. The tops of the walls, between the lugs form the seat for the shank of the tooth. The walls of the saddle are canted from each other slightly, so as to give the shank of the tooth an oblique direction as it rests upon its seat, to carry the tooth over to one side of the supporting channel-iron, and to give an even bearing for the tooth to prevent its rocking. The bottom of the saddle-walls terminates in legs $w$, which rest in the channel, and are held therein by the sides of the channel. The tooth is held down to its seat by a stirrup-shaped clip $w'$, provided with screw-bolt $w^2$, which is passed through the bottom cross-piece of the clip, and also through the channel-iron, and is rigidly secured by means of a jam-nut $w^3$, turned tightly in the channel of the supporting-iron. The front tooth is secured to a saddle $s'$, cast on the plate B, a bottom plan view of it being shown in Fig. 2. In that saddle the seat is composed of the walls $v'\ v'$, with extended lugs $v^3$ to $v^4$, between which the shank of the tooth is held. In this saddle the walls are not canted, as the front tooth is carried on a straight line with the saddle-arm and the center of the cultivator. The same form of triangular clip is used, and the bolt is passed through the saddle and a nut applied thereto on the top of the plate B at $x$.

The curved arms F, carrying the wheel, being pivoted to the lugs at the rear of the saddle, as above described, and also united by a front bolt $w^5$, are permitted to rise and fall with the wheel by said bolt playing in a slot $w^6$, formed in the walls of the saddles S′.

Having thus described my invention, what I claim is—

1. The combination, with a cultivator-beam, of a curved spring-tooth and open tooth-seat having diagonally-opposite and longitudinally-inclined edge-bearings adapted to receive and hold a curved obliquely-placed tooth, substantially as described.

2. A tooth-saddle adapted for attachment to a cultivator-beam and provided with opposite longitudinally-inclined ends, substantially as described.

3. A tooth-saddle adapted to be attached to a cultivator-beam, provided with opposite longitudinally-inclined ends and supporting lugs or flanges, substantially as described.

4. In a cultivator provided with curved spring-teeth, the combination therewith of a saddle having the walls which form the seat for the tooth-shank canted from each other to give the tooth an oblique direction and an even bearing, and a clip to hold the said saddle and tooth to the cultivator-bar, substantially as shown and described.

5. In a cultivator provided with arms composed of channel-iron, the combination therewith of the saddle S, provided with legs $w$, which rest in the channel, and are held therein by its sides and with the upwardly-projecting lugs, between which the shank of a tooth is held, and a stirrup-shaped clip and a screw-bolt for holding the tooth to the seat, substantially as described.

6. In combination with the side arms of a cultivator, the rear straps C, provided with holes, the channel-plate D, in which the said straps are adapted to slide and be held, the handles, the braces $e$, by which said handles are secured to said plate D, the said braces turned at right angles at the bottom to form lugs, and bolts to pass through said lugs, whereby the braces, plate, and straps are united and the side arms of the cultivator adjusted to and from each other, substantially as described.

7. In a cultivator, in combination with the wheel and its support, the front cross adjustable plate and the saddle cast in one piece with said plate, the tooth, and a clip for holding the shank of the tooth on said saddle, substantially as described.

8. The tooth-saddle composed of the canted walls and the upwardly-projecting lugs, in combination with a clip for rigidly securing the tooth to said saddle, substantially as described.

9. The saddle $s'$, having the ears $b^2$, in combination with the curved arms supporting the wheel and pivoted to said ears, substantially as described.

10. In a cultivator, the front cross-plate B, provided with holes, in combination with side arms and bolts, the rear straps C, and plate D, provided with holes and bolts, whereby the side arms are adjusted laterally at both ends, substantially as described.

In testimony whereof I affix my signature in presence of two witnesses.

DEWITT C. MARKHAM.

Witnesses:
JOSEPH H. BLACKWOOD,
M. J. HOYT.